R. M. MONTGOMERY.
SEAT.
APPLICATION FILED MAR. 18, 1921.
1,406,059.
Patented Feb. 7, 1922.
2 SHEETS—SHEET 2.
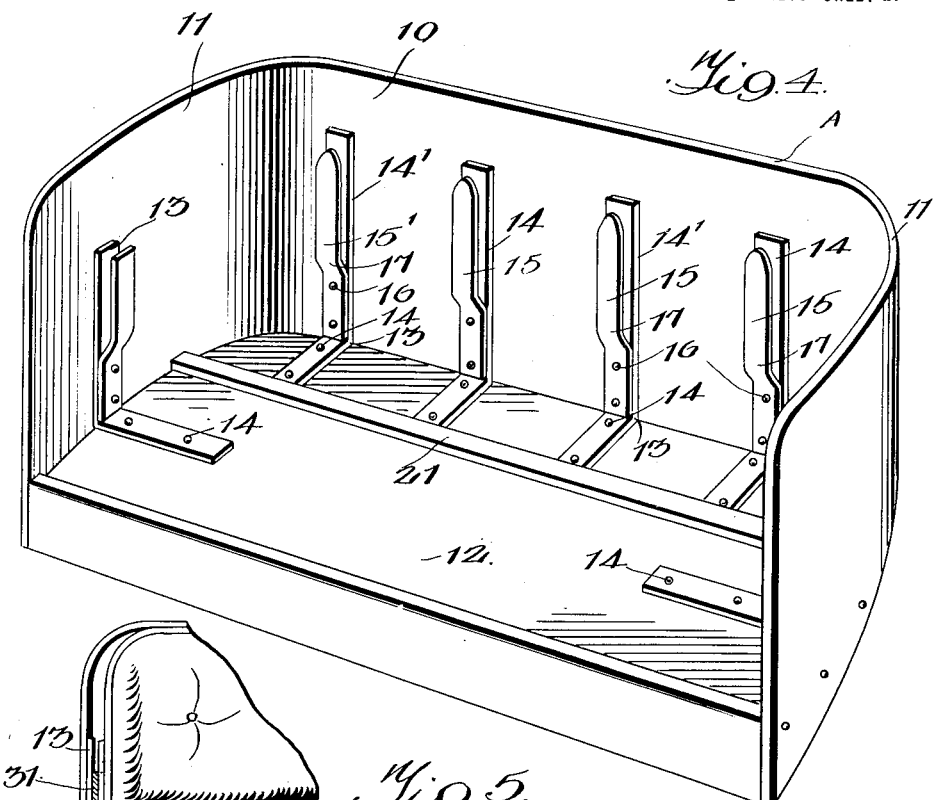
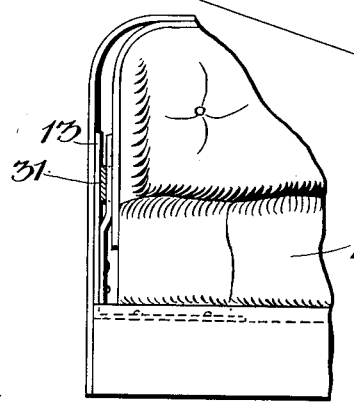
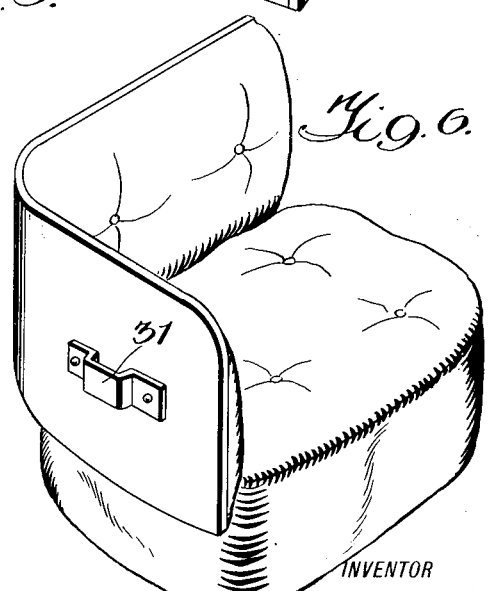
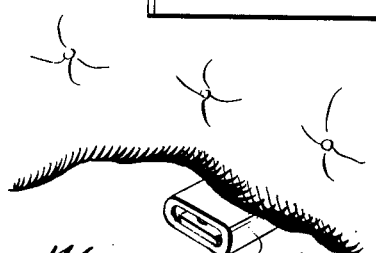
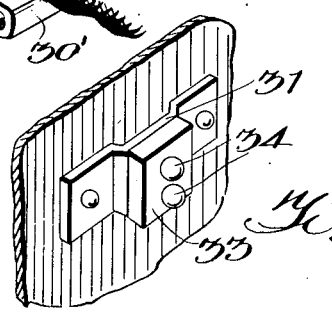
INVENTOR
R. M. MONTGOMERY,
BY
ATTORNEYS

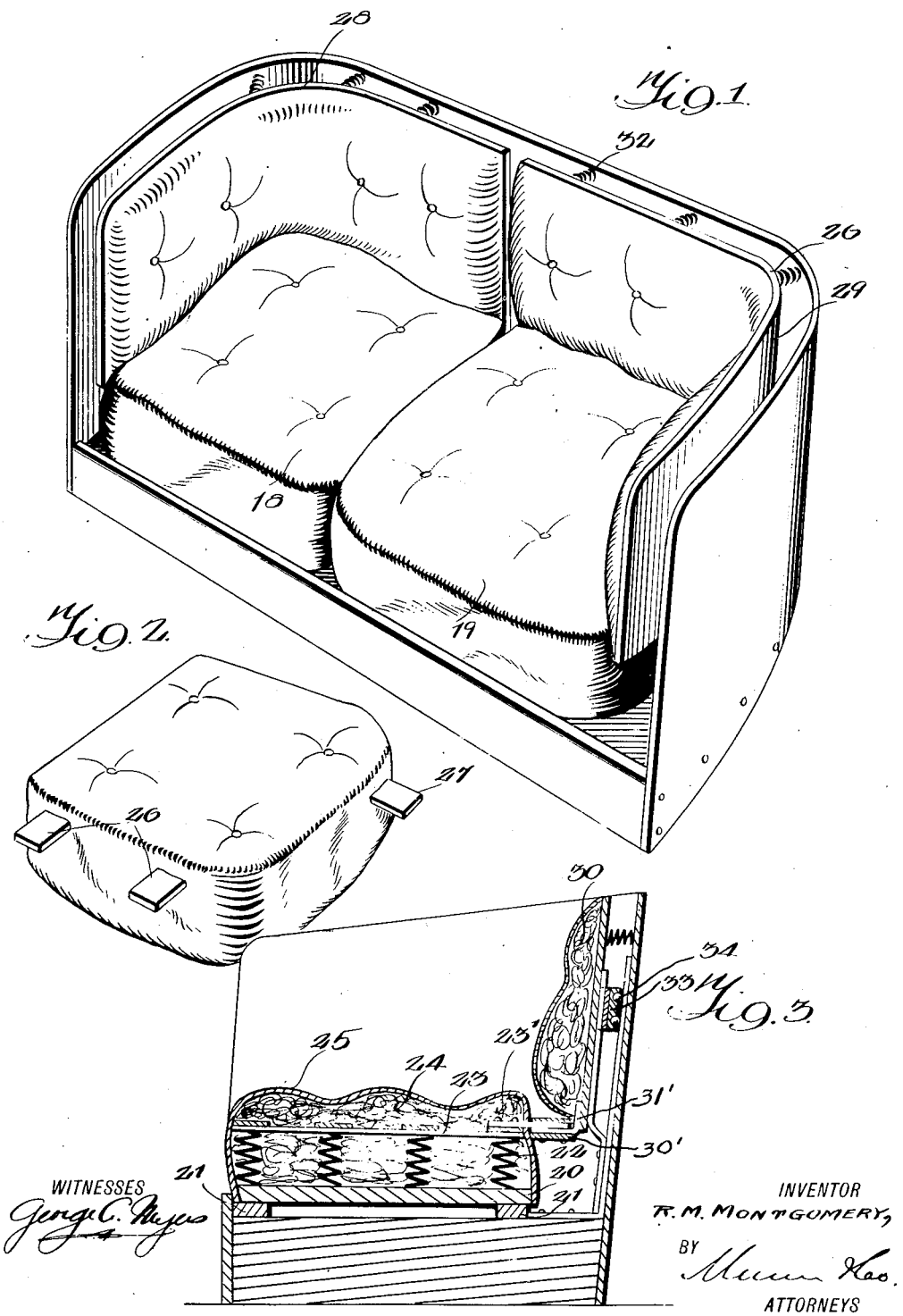

UNITED STATES PATENT OFFICE.

ROBERT MITCHEL MONTGOMERY, OF PONTIAC, MICHIGAN.

SEAT.

1,406,059.  Specification of Letters Patent.  Patented Feb. 7, 1922.

Application filed March 18, 1921. Serial No. 453,420.

*To all whom it may concern:*

Be it known that I, ROBERT M. MONTGOMERY, a citizen of the United States, and a resident of Pontiac, in the county of Oakland and State of Michigan, have invented certain new and useful Improvements in Seats, of which the following is a specification.

This invention relates to a seat and more particularly to the type of a seat employed in connection with an automobile or other vehicle.

The object of the invention is to provide a seat of such construction that the sides and back thereof are freely movable with the seat when said seat is moved upwardly or downwardly under the action of the springs associated therewith.

Other objects relating to the details of construction, combination and arrangement of parts will hereinafter more fully appear in the detailed description to follow.

In carrying out my invention a pair of companion seat sections are provided, each having its side and back attached thereto and these sections are mounted within a seat boxing, or the usual body structure of the vehicle or automobile which accommodates the seat upholstering. The seat sections are mounted within the seat boxing in such a manner that they are free for upward and downward movement as caused by the springs of the seat portion of each section.

The invention is illustrated by way of example in the accompanying drawings.

Figure 1 is a plan view of the seat construction showing the preferred form of my invention;

Figure 2 is an end side elevation of a seat section with its side and back removed;

Figure 3 is a transverse section of the seat construction shown in Figure 1 and taken on a line substantially central of one of the seat sections;

Figure 4 is an inside elevation of the seat boxing;

Figure 5 is a fragmentary end section showing the connection between the seat boxing and one of the seat sections;

Figure 6 is a perspective of one of the seat sections showing its back and side attached;

Figure 7 is a detailed end elevation of a side of one of the seat sections showing a modification of the connection between the seat sections and the seat boxing;

Figure 8 is a detailed view illustrating the detachable connection between the seat portion of each seat section and its back and side.

Referring to the drawings more particularly A indicates generally the seat boxing of which 10 is the back, 11 the sides and 12 the bottom. About the back and sides there is arranged a plurality of L-shaped bar members 13, each member being held in position by means of bolts or rivets as indicated at 14. To the vertical portion 14' of each L-shaped member 13 there is secured a short bar section 15 by the means of rivets as indicated at 16. The bar sections 15 are substantially of the same length as the vertical portions 14' of the members 14. Each of the bars 15 are bent as at 17 so that their upper portions may be spaced in relation with the inner face of the vertical portions 14'.

Referring to Figure 1, 18 indicates one of the seat sections and 19 the other. Each seat section comprises the usual bottom board 20, said board being seated in the usual manner upon the longitudinals 21. Upon this board there are positioned a number of coiled springs 22 of the usual construction and which support the frame structure generally indicated at 23. Above the frame structure there is deposited the usual stuffing 24 and the whole of the seat covered by suitable upholstering material as indicated at 25. Each seat section has extended from its one end a pair of metal strips 26 and also from its inner side a like metal strip 27, said strips being suitably secured to the frame 23 of the seat sections as shown at 23'. The back and side upholstering for each seat section are made into one as generally indicated at 28. Each of these combined side and back upholsterings comprises a metal body member 29 curved in the manner shown and provided with suitable cushioning or upholstering means on the front thereof as generally indicated at 30. At the lower edge of each member 29 there is secured a plurality of L-shaped members 31'; a short flattened tubular member 30' is riveted to the free end portion of each L-shaped member 31' as shown in Figures 3 and 8. The strips 26 and 29 extending from the seats 18 and 19 are adapted to slide within the flattened tubular members 30'. On each side portion of the body members 29 of the said sections, there is secured a channel clip 31; likewise a number of channel clips are secured on the rear portions of the body members 29, said channel clips being of the same number as the bars 15 and adapted for receiving the upper end portions thereof. The channel clips 31 are adapted to easily slide upon the bar members 15 so that the seat sections may have free vertical movement.

Referring to Figure 1, I have shown a plurality of compression springs 32 which are interposed between the back portion 11 of the seat boxing A and the back portions of the seat sections 18 and 19. These springs are preferably positioned near the upper edge of the back portion of the seat sections as shown in order that they may yieldably hold said sections against backward tilting movement and also lessen the pressure against the ball bearings and permit easier upward and downward movement of the seats.

Referring to Figure 3, I have shown a block member 33 secured to the top of a channel clip 31 and said block carrying a pair of ball-bearings as indicated at 34. The ball-bearings 34 engage the inner side surface of the vertical portions 14' of the members 14 and permit a more easy upward and downward movement of the seat sections 18 and 19. The ball-bearings 34 are primarily to eliminate any friction between the vertical portions of the members 14 and the upper surface of the channel clips 31. A bearing of this kind may be provided for each of the clips 31 if so desired.

I claim:

1. A seat structure of the class described, comprising a housing with a spring seat within said housing and its sides and back connected therewith, whereby said sides and back will move upwardly and downwardly with the springs of said seat, ball bearing units interposed between the confronting walls of said housing and back of the seat adapted to permit easy upward and downward movement of the seat, and yielding means extending between and connected to the confronting walls of the housing, and the back of seat respectively adapted to urge the seat forwardly and prevent binding of said ball bearings in the movements of said seat.

2. A seat structure of the class described, comprising a housing with a spring seat within said housing and its sides and back connected therewith, whereby said sides and back will move upwardly and downwardly with the spring of said seat, ball bearing units interposed between the confronting walls of said housing and back of the seat adapted to permit easy upward and downward movement of the seat, and compression springs extending between and connected to the confronting walls of the housing, and the seat back respectively adapted to urge the seat forwardly and prevent binding of said ball bearings in the movements of said seat.

ROBERT MITCHEL MONTGOMERY.